United States Patent [19]

Banton et al.

[11] Patent Number: 4,492,435
[45] Date of Patent: Jan. 8, 1985

[54] MULTIPLE ARRAY FULL WIDTH ELECTRO MECHANICAL MODULATOR

[75] Inventors: Martin E. Banton, Fairport; Pierre A. Lavallee, Penfield; Mehdi N. Araghi, West Webster; Joseph J. Daniele, Pittsford; Kwok L. Yip, Webster, all of N.Y.

[73] Assignee: Xerox Corporation, Stamford, Conn.

[21] Appl. No.: 394,604

[22] Filed: Jul. 2, 1982

[51] Int. Cl.$^3$ ............................................. G02F 1/29
[52] U.S. Cl. ................................. 350/360; 350/487; 350/269
[58] Field of Search ....................... 350/360, 487, 269

[56] References Cited

U.S. PATENT DOCUMENTS

| | | | |
|---|---|---|---|
| 3,746,911 | 7/1973 | Nathanson et al. | 315/21 R |
| 3,886,310 | 5/1975 | Guldberg et al. | 350/360 |
| 4,087,810 | 5/1978 | Hung et al. | 340/324 M |
| 4,281,904 | 8/1981 | Sprague et al. | 350/356 |

OTHER PUBLICATIONS

IBM (TDB), K. E. Peterson, "Micromechanical Light Deflector Array", vol. 20, No. 1, Jun. 1977.
IBM TDB (vol. 22, No. 11, Apr. 1980).
IBM TDB (vol. 23, No. 1, Jun. 1980).
IBM TDB (vol. 22, No. 12, May 1980).
IBM TDB (vol. 22, No. 5, Oct. 1979).
IBM TDB (vol. 21, No. 3, Aug. 1978).
"Dynamic Micromechanics on Silicon: Techniques and Devices" (IEEE Transactions, vol. ED-25, No. 10, Oct. 1978).
"Micromechanical Light Modulator Array Fabricated on Silicon" (Applied Physics Letters, vol. 31, No. 8, Oct. 15, 1977).
"The Mirror Matrix Tube: A Novel Light Valve for Projection Displays" (Proceeding of the S.I.D., vol. 16/3, Third Quarter 1975).
"Micromechanical Accelerometer Integrated with MOS Detection Circuitry" (CH1616-2/80/0000-0673, 1980 IEEE).
"Silicon Torsional Scanning Mirror" (IBM J. Res. Develop., vol. 24, No. 5, Sep. 1980).
"Silicon as a Mechanical Material" (IEEE Proceedings, vol. 70, No. 5, May 1982).

Primary Examiner—John K. Corbin
Assistant Examiner—Lynn Vandenburgh Kent
Attorney, Agent, or Firm—Frederick E. McMullen

[57] ABSTRACT

A full width opto-mechanical modulator comprised of a silicon chip have dual rows or arrays of flexible finger-like reflectors disposed thereon in staggered facing relationship to one another. The reflectors, the surface of which is highly reflective, bend in response to the application of a predetermined potential. The modulator is placed in the path of a beam of high intensity light, and potentials applied to selected reflectors in accordance with an image signal input cause the modulator to reflect light striking the individual reflectors in either an exposure path or against a beam stop.

7 Claims, 6 Drawing Figures

MULTIPLE ARRAY FULL WIDTH ELECTRO MECHANICAL MODULATOR

BACKGROUND OF THE INVENTION

This invention relates to a bit addressable linear modulator and, more particularly, to a modulator comprised of plural arrays of controllable reflecting fingers and an optical system therefor.

An extended Total Internal Reflection (TIR) light modulator/scanner of the type shown in U.S. Pat. No. 4,281,904 to R. A. Sprague et al is a single integrated device which images all the picture elements of a recording line simultaneously onto a photoreceptor. In that system, a polarized laser beam is focused at a relatively large TIR modulator, and is modulated by a spatially varying phase pattern generated by applying a voltage pattern to an array of individually addressed electrodes driven by an LSI chip. A Schlieren optical system with a zero-order stop is used to image the phase pattern onto the photoreceptor utilizing the central dark ground method.

However, the very nature of this type of imaging system may present problems. For example, a relatively large TIR modulator is required and this leads to reduction in fabrication yields. Coupling of the electric field into the electro optic crystal of the modulator may be degraded due to the small gap between the metal electrodes and the crystal. There may also be problems in providing a suitable soft interface.

Further, the optical system suffers from the common problem of non-uniformity in light across the recording line due to Gaussian fall-off of the laser beam and the possibility of dark areas (i.e. intensity nulls) between adjacent picture elements found with the central dark ground imaging method. And, the use of a Schlieren optical system in applications of this type may create a need for delicate optical alignment procedures which normally must be performed at the factory using special equipment rather than in the field.

SUMMARY OF THE INVENTION

To obviate the above, there is provided an opto mechanical modulator for modulating a sheet like beam of light striking the modulator in accordance with the image content of an image signal stream, the modulator comprising first and second parallel arrays of flexible reflecting fingers disposed in the path of the light beam, the fingers reflecting the portion of the light beam that strikes each finger along a first path, the axes of the fingers in one array being offset from the axes of the fingers in the second array with a finger width sufficient to prevent beam discontinuity, the fingers being bendable upon application of a preset potential to reflect the portion of the light beam that strikes the finger along a second path; and means for applying the potential to selected ones of the fingers in accordance with the image content of the image signal stream to provide a modulated output beam.

BRIEF DESCRIPTION OF THE DRAWINGS

Still other features and advantages of this invention will become apparent when the following detailed description is read in conjunction with the attached drawings in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives, and equivalents falling within the spirit and scope of the invention as defined by the appended claims.

Figure 1:
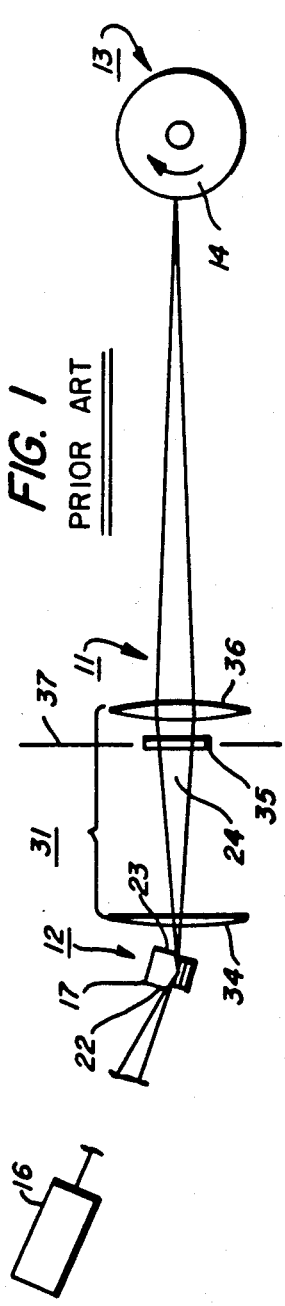
FIG. 1 is a schematic side view of a prior art electro optic line printer incorporating a bit addressable linear modulator.
Figure 2:
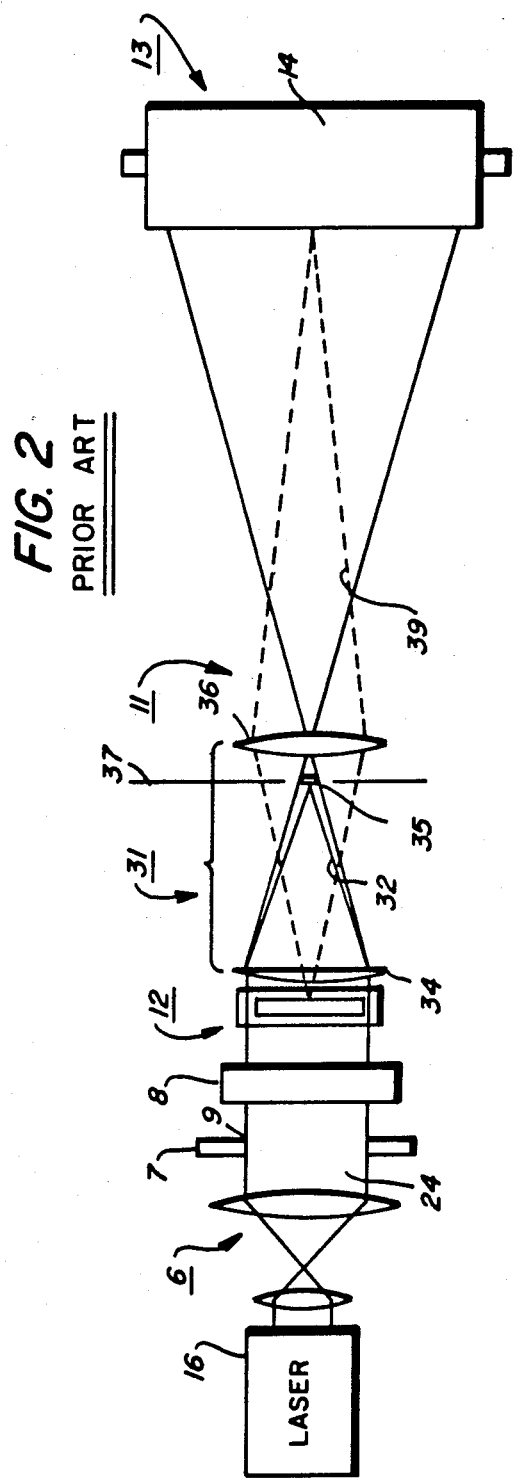
FIG. 2 is a schematic bottom plan view of the electro optic line printer shown in FIG. 1.

Referring particularly to FIGS. 1 and 2 of the drawings, there is shown a prior art electro optic line printer 11 of the type having a multi gate bit addressable linear TIR modulator 12 for exposing the printer photosensitive recording medium 13 in an image configuration. The recording medium 13 is depicted as being a photoconductively coated xerographic drum 14 which is rotated (by means not shown) in the direction of the arrow. It nevertheless will be evident that there are other xerographic and non-xerographic recording media that could be used, including photoconductively coated xerographic belts and plates, as well as photosensitive film and coated paper which may be supplied as web or cut sheet stock. The recording medium 13 should, therefore, be visualized in the generalized case as being a photosensitive medium which is exposed in an image configuration while advancing in a cross line or line pitch direction relative to the modulator 12.

TIR modulator 12 comprises an electro optic substrate 17, with a plurality of individually addressable electrodes, substrate 17 typically being a y cut crystal such as $LiNbO_3$ having an internal polished light reflecting surface. The electrodes are intimately coupled to the electro optic substrate adjacent the reflecting surface and are distributed across essentially the full width of substrate in parallel paired relationship.

In operation, a sheet like collimated beam of light 24 from a polarized laser 16 is transmitted through the input face 22 of the modulator substrate at a grazing angle of incidence relative to the internal reflecting surface, the light beam 24 being brought to a wedge shaped focus by beam expander 6, apertured plate 7, and cylindrical lens 8 prior to impinging on modulator 12. The light beam striking modulator 12 is totally reflected and exits modulator 12 through the output face 23 of substrate 17. As will be seen, light beam 24 illuminates substantially the full width of the substrate 17.

To modulate the light beam 24, successive sets of digital or analog image signals or pixel bits representing successive lines of the original image, are sequentially applied to the individually addressable electrodes of modulator 12, the image signals producing localized fringe fields within an interaction region of the electro optic substrate 17 defined by each electrode gap so that any time there is a voltage difference between consecutive electrodes, the pixel therebetween is on. Where no voltage difference exists between consecutive electrodes, the pixel is off. As a result, localized variations in the refractive index of the electro optic substrate 17 widthwise of the interaction region occur, which faithfully represent the image content of the signals applied to the modulator electrodes at any given point in time. As a result, the phase front of the light beam 24 is spatially and serially modulated line by line in accordance with the image signals as the light beam 24 passes through the interaction region of the electro optic substrate 17.

Schlieren central dark field imaging optics 31 which are optically aligned between the modulator 12 and the recording medium 13 are provided to image the modulated light beam onto the recording medium 13. As will be understood, the imaging optics 31 convert the spatial phase front modulation of the light beam 24 into a correspondingly modulated intensity profile and additionally, provide any magnification that is required to obtain an image of a desired width. Imaging optics 31 includes a field lens 34 for focusing the zero order diffraction components 32 of the phase front modulated light beam 24 onto a central stop 35 at the fourier transfer plane 37 and an imaging lens 36 for imaging the scattered higher order diffraction components onto the recording medium 13. The field lens 34 is optically aligned between the modulator 12 and stop 35 so that substantially all of the zero order components 32 of the light beam 24 are blocked by stop 35. The higher order diffraction components of the light beam 24 scatter around the stop 35 and are collected by the imaging lens 36 which, in turn, causes them to fall onto the image plane of modulator 12 defined by the recording medium 13.

Figure 3:
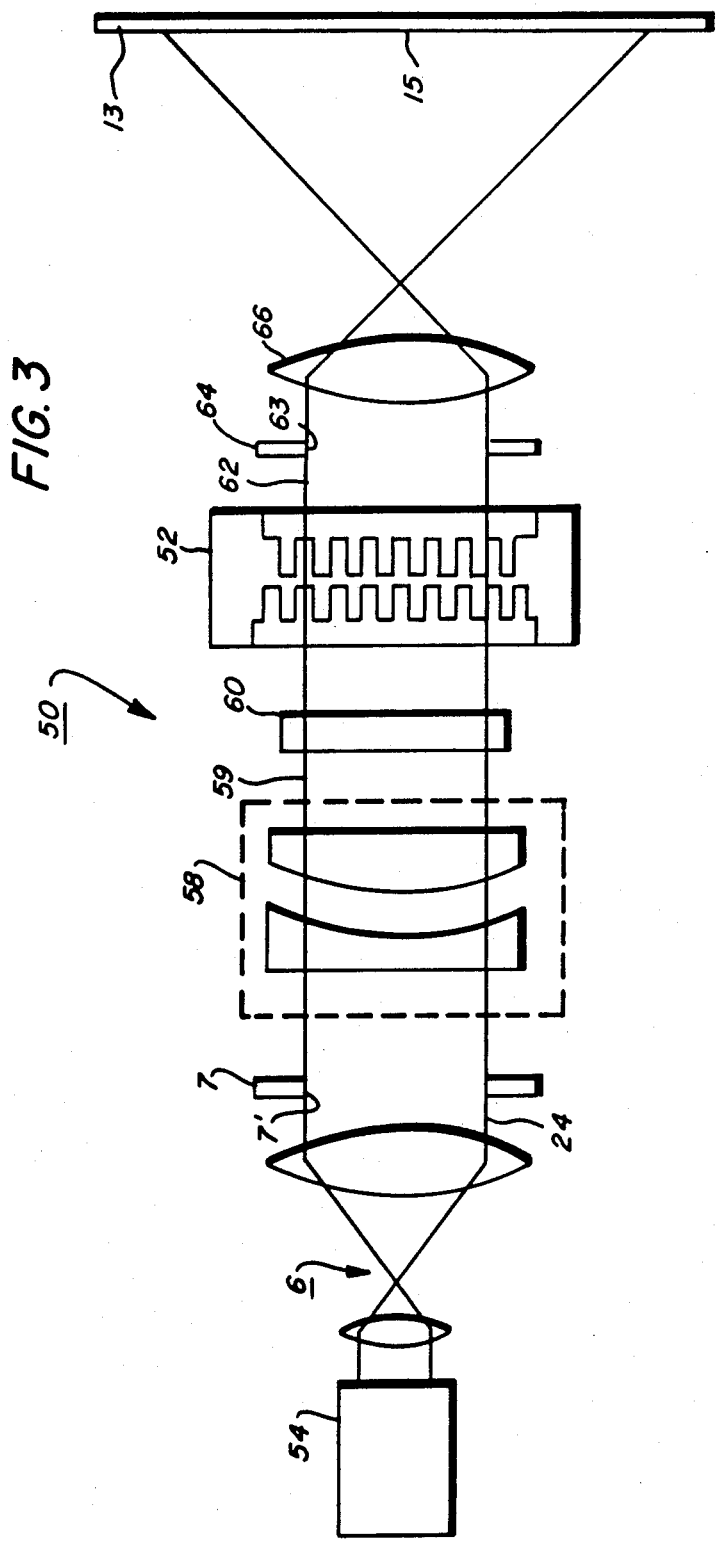
FIG. 3 is a schematic bottom plan view of an electro optic line printer incorporating the electro mechanical modulator of the present invention.

Referring now to FIG. 3 of the drawings where like numerals refer to like parts, an electro optic printer 50 is there shown incorporating the improved electro mechanical modulator 52 of the present invention. In the electro optic printer 50, a non-polarized laser 54 serves as the source of high intensity radiation, the beam of light output by laser 54 being expanded by the two lens beam expander 6 following which the expanded beam of light 24 passes through the line-like aperture or slit 7' of apertured plate 7. The sheet like beam of light 24 from apertured plate 7 is passed to an aspheric lens system 58 which transforms the collimated non-uniform sheet of light 24 into a collimated beam 59 of uniform intensity across the width of the scan line without loss of energy.

The sheet like collimated beam of light 59 from aspheric lens system 58 passes through cylindrical lens 60, striking modulator 52 at a predetermined grazing angle. Light reflected from the individual reflecting fingers of modulator 52, identified herein as first order beam 62, passes through the line like aperture or slit 63 in a second aperture plate 64 to a suitable projection lens 66 which magnifies and images the transmitted light on photoreceptor 13 at exposure point 15. Where modulator 52 is actuated, light (referred to herein as zero beam 61) impinges against a suitable beam stop (not shown).

Figure 5:
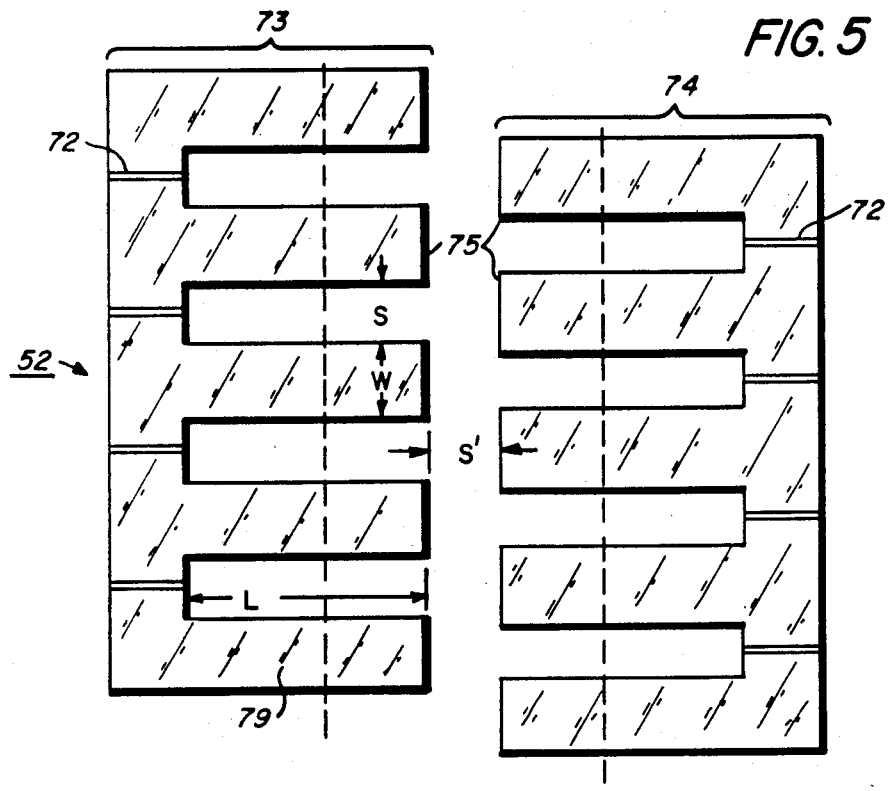
FIG. 5 is an enlarged top plan view of the modulator shown in FIG. 4.
Figure 4:
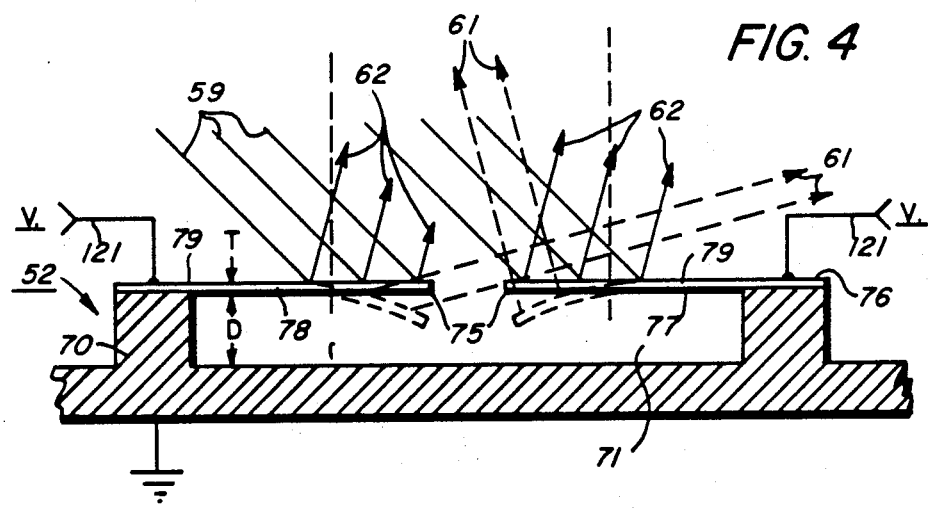
FIG. 4 is an enlarged side view in cross section of the electro mechanical modulator of the present invention.

Referring particularly to FIGS. 4 and 5 of the drawings, modulator 52 has an elongated generally rectangular base 70 which may for example comprise a silicone wafer. The central portion of base 70 is recessed at 71 to permit bending or arcing of reflecting fingers 75, each finger of which comprises an elongated flexible wafer or membrane secured to the base 70 so as to form two parallel arrays 73, 74. Each reflecting finger 75 is suitably attached to base 70 by the finger end 76 such that the remaining portion 77 of the finger projects outwardly in cantilever fashion above the recessed portion 71 of base 70, the recessed portion 71 permitting the reflecting fingers to bend or deflect as will appear. The linear axes of the reflecting fingers 75 of one array 73 are offset from the corresponding linear axes of the reflecting fingers of the other array 74 by a distance no greater than and preferably slightly less than the width (W) of the fingers 75 to assure that the light beams reflected by the individual fingers 75 form at least a continuous line of light.

Reflecting fingers 75 each preferably comprise a relatively thin flexible silicone dioxide substrate 78, the outer surface of which is covered with a highly reflective coating 79 which may for example comprise chromium. Fingers 75 are suitably insolated from one another as by gaps 72 in the coating 79. A modulator 52 having reflecting fingers 75 with a length (L) of 20 $\mu$m, a width (W) of 5 $\mu$m and a thickness (T) of 0.15 $\mu$m with spacing (S) between adjoining fingers of 4.75 $\mu$m and a recess depth (D) of 1.75 $\mu$m has been found suitable. While a separation (S') between fingers 75 of 5 $\mu$m has been found suitable, fingers 75 may be closer together so long as the fingers do not interfere with one another. Preferably, the overall length of the arrays 73, 74 of reflecting fingers 75 is at least equal to the maximum width of the image to be produced. For example, where an 8½ by 11 inch image is to be processed, the length of the arrays 73, 74 of reflecting fingers 75 would be at least 8½ inches, presuming that images are processed on photoreceptor 13 lengthwise. If image processing is performed in the cross-wise direction, the overall length of the arrays of reflecting fingers 75 are at least 11 inches.

Reflecting fingers 75 respond to the imposition of a voltage between the bottom of the well and the metallization that comprises coating 79, the resulting electrostatic force causing the finger 75 to which the voltage is applied to bend or deflect downwardly (as shown by the dotted lines in FIG. 4). The degree of bending or deflection obtained is dependent upon the voltage applied, and has been found to increase with increases in voltage up to a predetermined maximum. Typically, a maximum deflection of approximately 5° may be realized by the application of approximately 15 volts, the bending frequency of the cantilevered reflecting fingers 75 being approximately 338 kHz. As a result, the direction in which light striking the upper surface 79 of reflecting fingers 75 is reflected may be controlled by controlling application of the deflection voltage to the individual reflecting fingers 75 of modulator 52.

Figure 6:
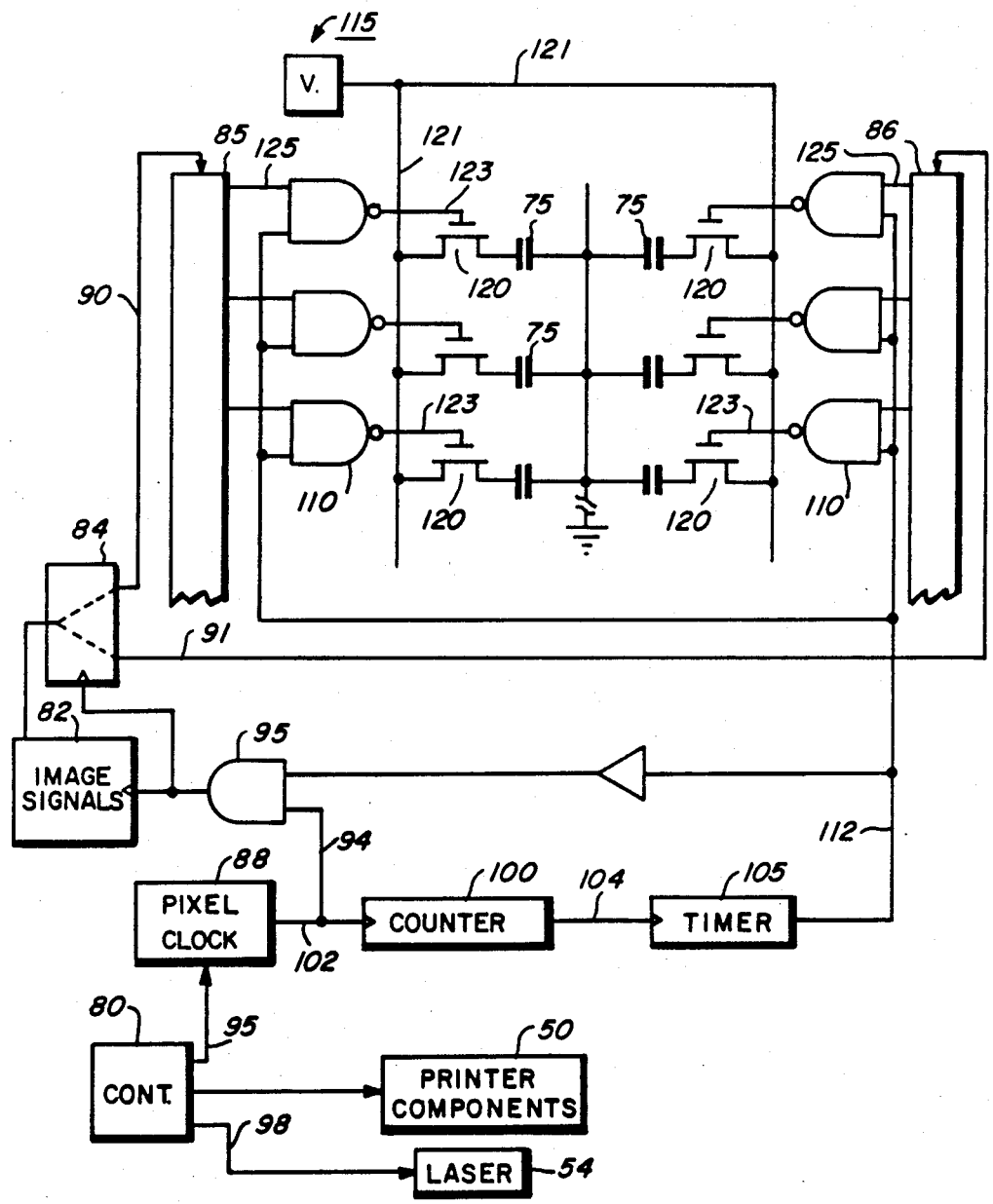
FIG. 6 is a schematic logic diagram of the control system for the electro optic line printer shown in FIG. 3.

Referring to the control schematic shown in FIG. 6 of the drawings, a suitable control module 80 is provided for operating printer 50. A suitable source 82 provides image signals, the output of image signal source 82 being coupled through exclusive OR gate 84 to the signal loading inputs of a pair of serial to parallel shift registers 85, 86. Gate 84, which is driven by clock pulses output by a pixel clock 88, serves to distribute the serial stream of image signals output by source 82 to alternate shift registers 85, 86 in succession. The output terminals of gate 84 are coupled to shift registers 85, 86 by lines 90, 91 respectively. As will be understood, image signal source 82 may comprise any suitable source of image signals such as a memory, communication channel, raster input scanner, etc. The output of pixel clock 88 is coupled to the clock input of image signal source 82 by clock lead 94 through AND function gate 95. Actuation of pixel clock 82 is controlled by a control signal output from control module 80 through lead 95.

Control module 80 regulates energization of laser 54 through lead 98. To control loading of image signals from image signal source 82 to shift registers 85, 86, a suitable counter 100 is provided, counter 100 being driven by the clock pulses from pixel clock 82 through clock line 102. The output of counter 100 is coupled by line 104 to the input terminal of a suitable exposure interval timer 105. The output of timer 105 is coupled to one input of NAND function exposure control gates 110 for reflecting fingers 75 and to a second input of gate 95 through line 112.

A suiable deflection voltage source 115 is provided for deflecting reflecting fingers 75, voltage source 115 being coupled to reflecting fingers 75 through finger control gates 120 and lines 121. Base 70 of modulator 52 is grounded. The control terminals of gates 120 are coupled to the output sides of exposure control gates 110 through lines 123. The individual output stages of shift registers 85, 86, which equal the number of image signals that comprise an image line divided by two, are coupled by lines 125 to a second input of exposure control gates 110.

OPERATION

In operation, a signal from scanner control module 80 actuates printer 50 thereby initiating movement of the recording medium 13 past imaging station 15. A signal from control module 80 also energizes laser 54 and pixel clock 88. It is understood that a deflection voltage from voltage source 115 is applied to the arrays 73, 74 of reflecting fingers 75 that comprise modulator 52 through control gates 120. The application of a deflection voltage to the individual reflecting fingers 75 that comprise modulator 52 generates an electrostatic force which causes the individual fingers 75 to bend or curve downwardly as shown by the dotted lines in FIG. 4. As a result, the beam light 59 from aspheric lens system 58 is reflected in total by the arrays of reflecting fingers 75 as zero order beam 61, the beam 61 impinging against the beam stop (not shown).

The clock pulses output by clock 88 clock image signals from the image signal source 82 to shift registers 85, 86, the image signals being loaded in alternate fashion into the registers 85, 86 by gate 84, i.e. the even image signals being loaded in shift register 85 and the odd image signals in shift register 86. At the same time, clock pulses from clock 88 toll a count on counter 100. On reaching a count equal to the total number of image signals that comprise a line, the signal from counter 100 triggers timer 105 to apply an enabling signal to exposure control gates 110 for a preset interval while the change in signal output of timer 105 disables gate 95 to temporarily terminate the input of clock pulses to image signal source 82.

Where the image signal at each stage of shift registers 85, 86 is relatively low (i.e. a binary 0), the state of the control gate 120 associated therewith remains unchanged. As a result, the voltage from voltage source 115 continues to be applied to the reflecting fingers 75 coupled thereto, the electrostatic force produced holding the fingers in the bent or arced position shown by the dotted lines of FIG. 4. Accordingly, the rays striking any reflecting fingers in this condition continue to be reflected as zero order beams against the beam stop (not shown).

Where the image signals at the output of the individual stages of shift registers 85, 86 is relatively high, (i.e. a binary 1), the control gate associated therewith is triggered to deactuate the associated control gate 120 and interrupt the application of voltage from voltage source 115 to the reflecting finger 75 associated therewith. With the termination of the electrostatic force, the finger springs back to the straight or level position shown by the solid lines of FIG. 4. Light rays impinging against any now undeflected fingers 75 is reflected along the first beam path 62 and through slit 63 in aperture plate 64 to projection lens 66 which focuses the light rays onto recording medium 13 at exposure point 15. The momentary application of light to recording medium 13 exposes the recording medium and creates a latent image line in accordance with the content of the image signal output of image signal source 82.

Following a preset exposure interval, timer 105 resets to disable distribution gates 110, again permitting application of the voltage from voltage source 115 to the arrays 73, 74 of reflecting fingers 75. As a result, the beam of light impinging against the reflecting fingers 75 of modulator 52 is reflected as zero order beam 61 against the beam stop (not shown) pending reloading of shift registers 85, 86 with the next line of image signals from image signal source 82. Following reloading of shift registers 85, 86, the foregoing process is repeated to image the next image line on photoreceptor 13, and so on and so forth until the image is completed at which point the printer 50 is shutdown.

It will be understood that the aforedescribed logic control system is exemplary only and other systems for operating modulator 52 to selectively expose a recording medium in response to an image signal input may instead be envisioned. And while light reflected by reflector fingers 75 of modulator 52 when in an undeflected condition (i.e. first order beam 62) is illustrated as comprising the exposure beam for exposing the recording medium, reflected light from fingers 75 when in a deflected condition may instead be used to expose the imaging member.

While the invention has been described with reference to the structure disclosed, it is not confined to the details set forth, but is intended to cover such modifications or changes as may come within the scope of the following claims.

We claim:

1. An electro-mechanical modulator for modulating a sheet like beam of light striking the modulator in accordance with the image content of an image signal stream, comprising:

(a) first and second parallel arrays of flexible reflecting fingers disposed in the path of said light beam, the fingers in each of said arrays being in adjoining spaced relation to one another whereby to permit said fingers to deflect individually, said fingers when undeflected reflecting the portion of the light beam that strikes each of said fingers along a first path, the axes of the fingers in one of said arrays being offset from the axes of the fingers in the second of said arrays with each of said fingers having a width sufficient to span the space between adjoining fingers in the array opposite thereto and prevent beam discontinuity, said fingers being individually deflectable upon application of a preset potential to individually reflect the portion of the light beam that strikes each of said deflected fingers along a second path; and (b) means for applying said potential to selected ones of said fingers in accordance with the image content of said image signal stream to provide a modulated output beam.

2. An electro-mechanical modulator for modulating a beam of light to provide an image exposure beam comprising in combination:

(a) a substrate; and (b) at least two opposing rows of reflectors, each of said reflector rows being comprised of a plurality of separate closely spaced finger-like reflecting elements on said substrate adapted on interposition into the path of a light beam to reflect the portions of said light beam striking each individual one of said reflecting elements along a first path;

said reflecting elements bending in response to application of a predetermined electrical potential thereacross to reflect the light portion striking said bent reflecting elements along a second path;

light rays reflected along one of said first and second paths cooperating to form said exposure beam.

3. The modulator according to claim 2 in which a portion of said substrate between said reflector rows is recessed, each of said reflecting elements being mounted on said substrate at one end so that the opposite end of each of said reflecting elements is in spaced relation to said substrate recessed portion, said substrate recessed portion permitting said reflecting elements to bend in response to said predetermined electrical potential.

4. The modulator according to claims 2 or 3 in which the reflecting elements of one reflector row are staggered relative to the reflecting elements of the other second reflector row.

5. In a micro deflector array having a substrate with plural individual flexible reflective fingers supported thereon for bending movement, said fingers being supported by one end in cantilever fashion with bendable opposite end, each of said fingers being bendable on application of a preset signal thereto whereby light striking said fingers is selectively reflected along at least one of two paths in response to the presence or absence of said signal, the improvement comprising:

two parallel rows of said fingers, the bendable ends of the fingers comprising one of said rows being in spaced opposing relation to the bendable ends of the fingers comprising said other row, the axes of the fingers of one of said rows being offset from the axes of the fingers of the other of said rows to assure overlap and prevent dark areas between adjoining ones of said fingers in each of said rows.

6. In an image output scanner, the combination of:

(a) a non-polarized source of light;

(b) optical means forming a sheet-like beam of light from light emitted by said light source;

(c) at least two parallel opposed arrays of deflectable reflectors disposed to intercept said sheet-like beam of light, each of said reflectors being spaced apart from the adjoining reflector in the array to permit said reflectors to deflect individually and reflect the portion of said sheet-like beam of light striking said reflector along a first path when said reflector is undeflected and along a second path when said reflector is deflected, the axes of the reflectors of one array being offset from the axes of the reflectors of the second array to prevent discontinuity and loss of light from the space between adjoining reflectors in each of said arrays;

(d) an imaging member on which images are created through selective exposure by the portions of said sheet-like beam of light reflected by said reflectors along one of said first and second paths;

(e) second optical means for projecting the portions of said sheet-like beam of light reflected by said reflectors along said one path onto said imaging member; and (f) means to deflect said reflectors individually in response to an image signal input whereby to create images represented by said image signal input on said imaging member.

7. The scanner according to claim 6 including a substrate, the reflectors of one of said arrays being supported in opposing relation to the reflectors of said other array on said substrate such that the terminal ends of the reflectors of one of said arrays are in juxtaposition to the terminal ends of the reflectors of said other array, said substrate having a recessed portion extending between said arrays of reflectors enabling said reflector terminal ends to deflect.

* * * * *